(12) United States Patent
Hillmann et al.

(10) Patent No.: US 6,407,804 B1
(45) Date of Patent: Jun. 18, 2002

(54) ASSEMBLY FOR DETECTING THE SUPERFICIAL STRUCTURES OF FINGERS AND/OR PALMS

(75) Inventors: Juergen Hillmann; Uwe Richter, both of Jena (DE)

(73) Assignee: Heimann Biometric Systems GmbH, Jena (DE)

( * ) Notice: Subject to any disclaimer, the term of this patent is extended or adjusted under 35 U.S.C. 154(b) by 0 days.

(21) Appl. No.: 09/762,351
(22) PCT Filed: May 31, 2000
(86) PCT No.: PCT/EP00/04974
§ 371 (c)(1),
(2), (4) Date: Feb. 5, 2001
(87) PCT Pub. No.: WO00/75858
PCT Pub. Date: Dec. 14, 2000

(30) Foreign Application Priority Data

Jun. 4, 1999 (DE) .......................... 199 27 025

(51) Int. Cl.$^7$ ................................. G06K 9/74
(52) U.S. Cl. ......................................... 356/71
(58) Field of Search ................. 356/71, 601; 382/4, 382/5

(56) References Cited

U.S. PATENT DOCUMENTS 4,792,226 A * 12/1988 Fishbine et al. .............. 356/71

FOREIGN PATENT DOCUMENTS

| DE | 41 03 646 | 1/1992 |
| DE | 44 21 243 | 12/1994 |
| JP | 10-149488 | 6/1998 |
| JP | 10-1776494 | 6/1998 |

* cited by examiner

*Primary Examiner*—Frank G. Font
*Assistant Examiner*—Michael P. Stafira
(74) *Attorney, Agent, or Firm*—Reed Smith LLP

(57) ABSTRACT

An arrangement for detecting the surface structures of fingers, palms or other parts of the skin placed on an image scanning surface, wherein the image scanning surface is formed at a scanning prism, an illumination beam path is directed to the image scanning surface in the interior of the scanning prism, and the light reflected from the latter impinges on the reception surface of an optoelectronic detection device. In an arrangement of the type described above, a part of the illumination beam path or a separate illumination beam path is directed to reference structures which are fixed in place and, from the latter, to the reception surface, wherein separate partial areas of the reception surface are reserved for the detection of the surface structures and for the detection of reference structures.

15 Claims, 5 Drawing Sheets

US 6,407,804 B1

ASSEMBLY FOR DETECTING THE SUPERFICIAL STRUCTURES OF FINGERS AND/OR PALMS

BACKGROUND OF THE INVENTION a). Field of the Invention

The invention is directed to an arrangement for detecting the surface structures of fingers, palms or other parts of the skin placed on an image scanning surface, wherein the image scanning surface is formed at a scanning prism, an illumination beam path is directed to the image scanning surface in the interior of the scanning prism, and the light reflected from the image scanning surface impinges on a reception surface of an optoelectronic detection device.

b). Description of the Related Art

As with other precision optical equipment in which image information is acquired by scanning, arrangements of this type must be monitored and calibrated by technical apparatus to ensure operability and accuracy requirements.

For example, in a line image scanner outfitted with an image scanning surface, a sensor line and a mechanical drive for displacing the sensor line, it is provided in Patent DE 41 03 646 C1 to carry out the geometric calibration with the aid of reference marks which are applied to an edge of the image scanning surface running vertical to the sensor line and to image them on the sensor line during the image scanning. The images of reference marks which are obtained in the course of a scan are used to monitor and, if necessary, correct the displacement speeds and, in this way, to compensate for distortions caused by a displacement speed diverging from the reference value. However, this suggestion is not suited to calibration of devices with a stationary surface image scanner.

In devices having a stationary surface image scanner, for example, an array of individual sensors, it was formerly common for reference structures which are used over and over again in the course of operation as a basis for comparison with the results obtained by the same arrangement to be included with delivery to the user. The user or service can ascertain from time to time on the basis of these reference structures whether the quality parameters have been maintained or have resulted in deviations due to influences of some kind, e.g., aging or wear of subassemblies, which must be corrected. It is also often necessary to check the functioning of the equipment after assembly, e.g., for cleaning purposes.

The reference structures in the form of test structures are arranged on a carrier, e.g., a sheet or foil, which is placed on the image scanning surface for checking the equipment function. The test structures are recorded by the device and the results of the recording are subsequently compared with the test structure. Based on this comparison, it is possible to ascertain whether the arrangement still corresponds to quality requirements or whether changes have taken place. The foil with the test structures is then removed from the image scanning surface which is now available again for detection of surface structures of fingers and palms.

In this regard, the same areas of the image scanning surface are utilized for equipment testing and for the detection of the surface structures of the fingers and palms. In order to preclude falsification of test results, it is necessary to thoroughly clean the image scanning surface before placing the foil. Further, the foil must be carefully stored and handled so that it is not damaged, and it must also be carefully placed so that there is optical contact with the image scanning surface. In this connection, it is often recommended that an optical coupling medium, such as oil or water, is introduced between the image scanning surface and the foil. However, even when this is done, there is also a danger of falsified results, namely, when the layer thicknesses between the image scanning surface and the foil are too great or too varied.

The above-described procedure for calibration is stipulated, for example, by the Federal Bureau of Investigation (FBI) in the USA for automatic fingerprint identification systems which are used for official detection purposes to ensure that these systems meet the required technical parameters over their entire period of use.

OBJECT AND SUMMARY OF THE INVENTION

Based on this prior art, it is the primary object of the invention to reduce the sources of error and the possibilities of error when checking arrangements for detecting the surface structures of fingers and palms supported on an image scanning surface.

According to the invention, in arrangements of the type described above, a part of the illumination beam path or a separate illumination beam path is directed to reference structures and, from the latter, to the reception surface of the optoelectronic detection device, wherein separate partial areas of the reception surface are reserved for the detection of surface structures and for the detection of reference structures.

By means of the arrangement according to the invention, it is possible at desired times before, during or after the recording of fingerprint images or palm print images to obtain images of the reference structures, to base a check of the quality parameters on the results, and to draw conclusions from these results about the optical and electronic characteristics of the arrangement.

In a preferred construction of the invention, it is provided that the reference structures are arranged on the image scanning surface so that they cannot change position, wherein separate partial areas of the image scanning surface which do not intersect are reserved for the reference structures and for the support of the fingers or palms and a common illumination beam path is provided for these partial areas. The areas of the image scanning surface which are provided for placement of the fingers or palms are accordingly no longer required for carrying out the equipment test.

A substantial advantage consists in that the detection of fingerprints and hand prints and the recording of images of the reference structures are no longer mutually exclusive and, therefore, can be carried out simultaneously and not only consecutively. Further, a falsification of the test results due to contamination caused by contact with the fingers or palms, at least for the areas of the image scanning surface reserved for the reference structures, and the occurrence of errors resulting from the arrangement of optical intermediate layers (oil, water) between the image scanning surface and a movable carrier provided with the reference structures is ruled out. The disadvantages of the prior art are overcome in this way.

In the latter constructional variant, the reference structures are applied directly to the image scanning surface, i.e., they are arranged in the object plane. In contrast, in a further development of the invention, the reference structures, although they are likewise unchangeable with respect to position, are positioned outside of the object plane, for example, at the entrance face for the illumination beam path and/or at the exit face for the beam reflected by the image scanning surface. Accordingly, the reference structures are placed out of contact with the fingers or palms to be imaged in a highly dependable manner.

Further, the optoelectronic detection device is combined with an evaluating circuit in which the images which are obtained from the reference structures and which characterize the actual state of the arrangement are subjected to a comparison with electronically stored data giving the reference state, and conclusions are drawn concerning whether or not the quality parameters specific to the equipment are being adhered to. Automatic monitoring is possible in this way.

In this regard, it lies within the scope of the invention to provide a control circuit by which, for example, whenever the apparatus is put into operation and/or after expiration of a predetermined operating period, the reference structures are recorded and the recorded images are compared with the stored data. When this comparison has negative results, the erroneous detection of fingerprints or hand prints is prevented when minimum requirements are not met by triggering an alarm, an error message on the device display or by emitting a switch-off pulse to the device control.

In addition or as an alternative to the arrangement described above, means are provided for manually triggering the optical detection of the reference structures and checking can be initiated at optional determined times. For this purpose, for example, there is a hand switch combined with the control circuit, which hand switch is actuated before, during or after detection of fingerprints and hand prints.

Further, a cover can be provided over the reference structures arranged on the image scanning surface. This prevents the reference structures from exposure to continual contact by fingers or hands and accordingly from contamination.

As an alternative or in addition to the stationary arrangement of the reference structures at the image scanning surface, the light entrance surface or light exit surface at the scanning prism, it is possible to provide an optic device for reflecting and/or mixing reference structures into the illumination beam path, so that image information about reference structures reaches the reception surface of the optoelectronic detection device in this way and can serve as a basis for the calibration of the arrangement in the manner described above.

For example, grooves with different widths and different spacing and orientation can be used as reference marks. The contrast transfer (Contrast Transfer Function —CTF) which is used as a basis for the assessment of the modulation transfer (Modulation Transfer Function—MTF) can be determined in this way in particular. It is also possible to provide structures with high-contrast light-dark and dark-light transitions in horizontal and vertical direction, so that the MTF can be checked by Fourier analysis.

It is also possible to provide an empty field under the reference structures which is used for checking the linearity and noise of the arrangement by adjusting the shutter of the detection device in defined steps under constant illumination and comparing the resulting output signal with the data which can be called up from the memory.

It is further possible to provide two test marks which are arranged at a defined distance from one another and which are used for checking the image scale. Accordingly, it is also possible to check the image scale over time intervals in that the respective measurement results are used as a basis for the comparison with values stored during manufacture, with reference to the two extension directions of the image scanning surface.

In addition to the solution described above, the object of the invention is further met in that semi-transparent reference structures are introduced in the illumination beam path, on the object surface and/or in the beam reflected by the image scanning surface; in so doing, the surface structure (of the finger or palm) to be detected as well as the semi-transparent reference structures are acted upon by the beam and the beam striking the reception surface of the detection device carries image information concerning the surface structure as well as image information about the reference structures.

The reference structures can be positioned in such a way that they are covered by the surface structure to be detected, i.e., there are no separate areas of the beam path or of the reception surface reserved exclusively for the detection of the surface structure or exclusively for the detection of the reference structures.

However, it is provided for this purpose that the evaluating circuit is constructed according to claim 6. In this respect, a first computing function for determining a correction factor $i_{ij}$ for every image element ij is provided in the evaluating circuit, where $k_{ij}$=reference gray value/actual gray value, wherein every image element ij corresponds to an individual sensor of the reception surface. The reference gray values are advantageously determined for every individual sensor with a uniformly bright image without structures and a second computing function is provided by which the determined actual gray value of every image element ij is multiplied by the associated correction factor $k_{ij}$.

By means of this arrangement according to the invention it is likewise achieved that checking or calibration can be carried out with fingers or palms placed on the image scanning surface as well as when the image scanning surface is empty. Namely, with the evaluating circuit which is constructed as shown, the image recorded from a surface structure can be processed in such a way that the gray value determined for each image element ij is corrected such that an image is obtained which has only the structures of the finger or palm in the areas in which the finger or palm is placed and the reference structure has been "corrected out". For this purpose, it is assumed that the correction values $k_{ij}$ are stored so as to enable a unique correlation to the corresponding image element ij.

When a test run is carried out without a finger or palm, a uniformly bright image without structures results with the correct correction values k. If this is not the case, the correction values $k_{ij}$ must be read in again.

BRIEF DESCRIPTION OF THE DRAWINGS

The invention will be described more fully in the following with reference to an embodiment example. In the accompanying drawings.

DESCRIPTION OF THE PREFERRED EMBODIMENTS

Figure 1:
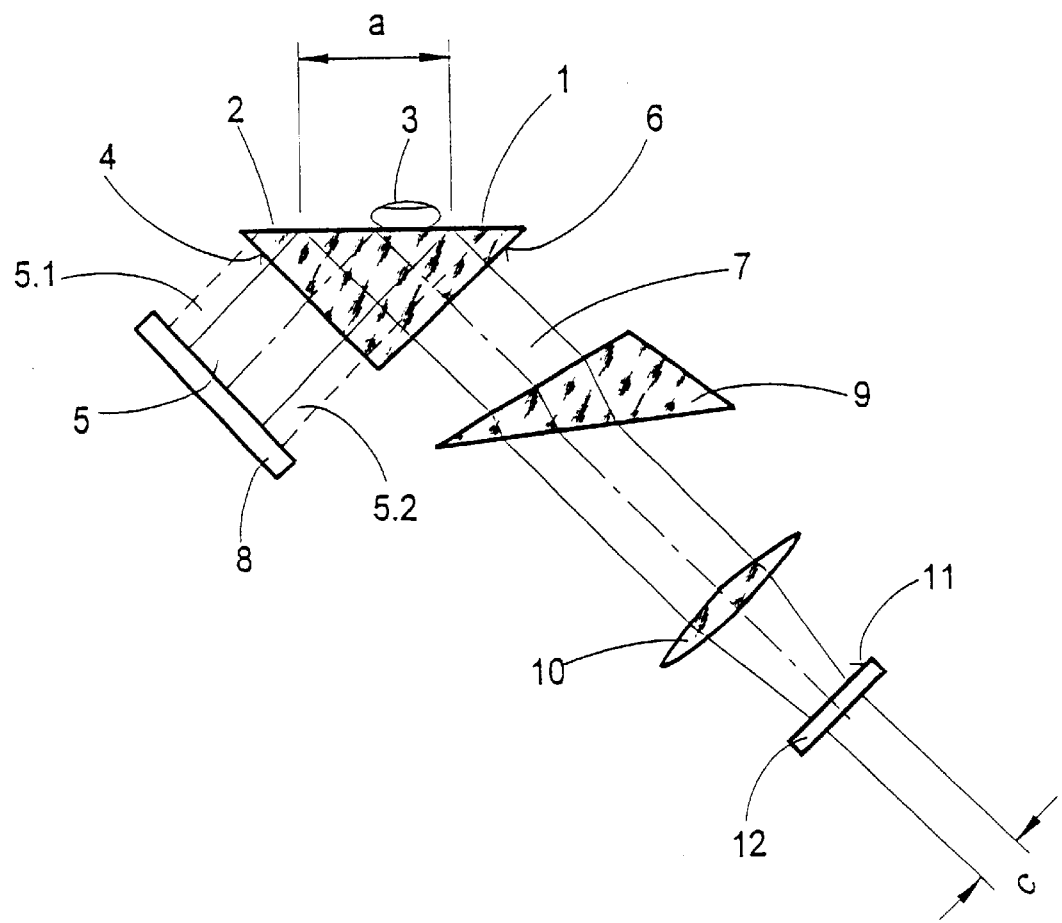
FIG. 1 shows a schematic view of a comparable arrangement according to the known prior art.

FIG. 1 shows an arrangement for the recording of fingerprints as is known from the prior art. In this case, a finger 3 whose print is to be detected is placed on the image scanning surface 1 of a scanning prism 2. The scanning prism 2 has an entrance face 4 for an illumination beam path 5 and an exit face 6 for the light, referred to hereinafter as object beam path 7, reflected inside the scanning prism 2 from the image scanning surface 1.

The illumination beam path 5 proceeds from an illumination source 8 which is constructed, for example, as a two-dimensional arrangement of a plurality of light emitting diodes (LEDs) followed by a diffusor. The illumination beam path 5 is directed to the image scanning surface 1 in the interior of the scanning prism 2 at an angle $\alpha$ which makes it possible to obtain images of the fingerprint using the principle of frustrated total reflection.

The object beam path 7 is directed through a correcting prism 9 and an objective 10 onto the photosensitive reception surface 11 of an optoelectronic detection device 12. The reception surface 11 is formed, for example, of a plurality of individual senors arranged in an orthogonal grid and the optoelectronic detection device 12 is part of a CCD camera which is combined, in a manner known per se, with an evaluating circuit for the electronic image information that can be tapped at its output.

It can further be seen from FIG. 1 that only an area with width a of the image scanning surface 1 is provided for placement of the finger (or several fingers or a palm), while the edge areas are not used. Also, only that area of the reception surface 11 having width c in the drawing plane of FIG. 1 and on which the object beam path 7 is focussed is used.

Figure 2:
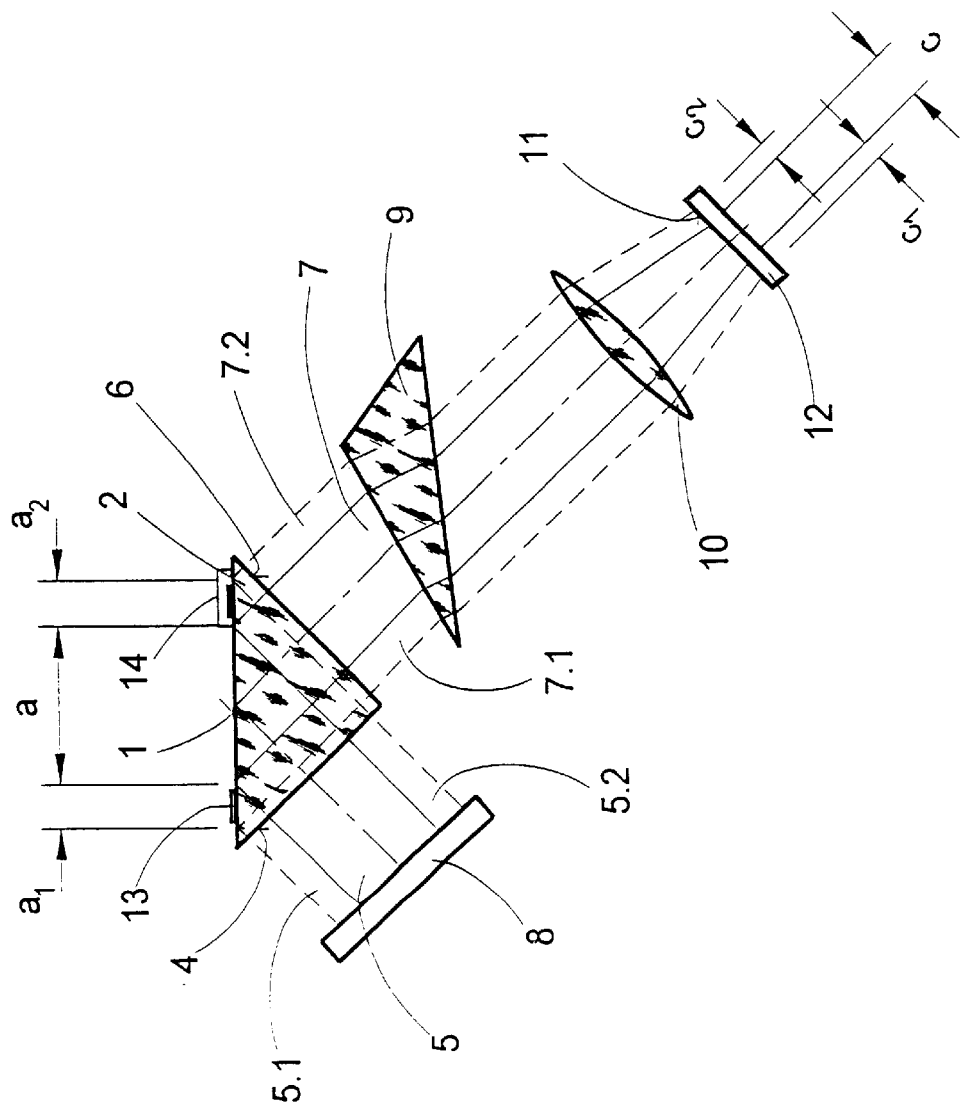
FIG. 2 shows a schematic view of the arrangement according to the invention.

In order to carry out calibration of the arrangement, it is provided, as can be seen in FIG. 2, that reference structures 13 are arranged in the edge areas $a_1$ and $a_2$ of the image scanning surface 1 which are located outside the width a provided for the detection of fingerprints and palm prints. Beam components 5.1 and 5.2 of the illumination beam path 5 strike these reference structures 13, and the beam components 5.1 and 5.2 of the illumination beam which are reflected by the edge areas $a_1$ and $a_2$ reach the reception surface 11 as beam components 7.1 and 7.2 of the object beam path 7, where they impinge on edge areas designated by $c_1$ and $c_2$. Edge areas $c_1$ and $c_2$ are located outside of the width c reserved for the detection of fingerprint and palm print images.

As is shown in the following, the reference structures 13 are constructed in such a way that their images which are received by the optoelectronic detection device 12 and sent to the evaluating circuit can be subjected to a comparison with electronically stored data which serve as a measurement for the quality parameters of the arrangement and conclusions may be drawn as a result of this comparison about whether these quality parameters are adhered to or diverged from.

Figure 3:
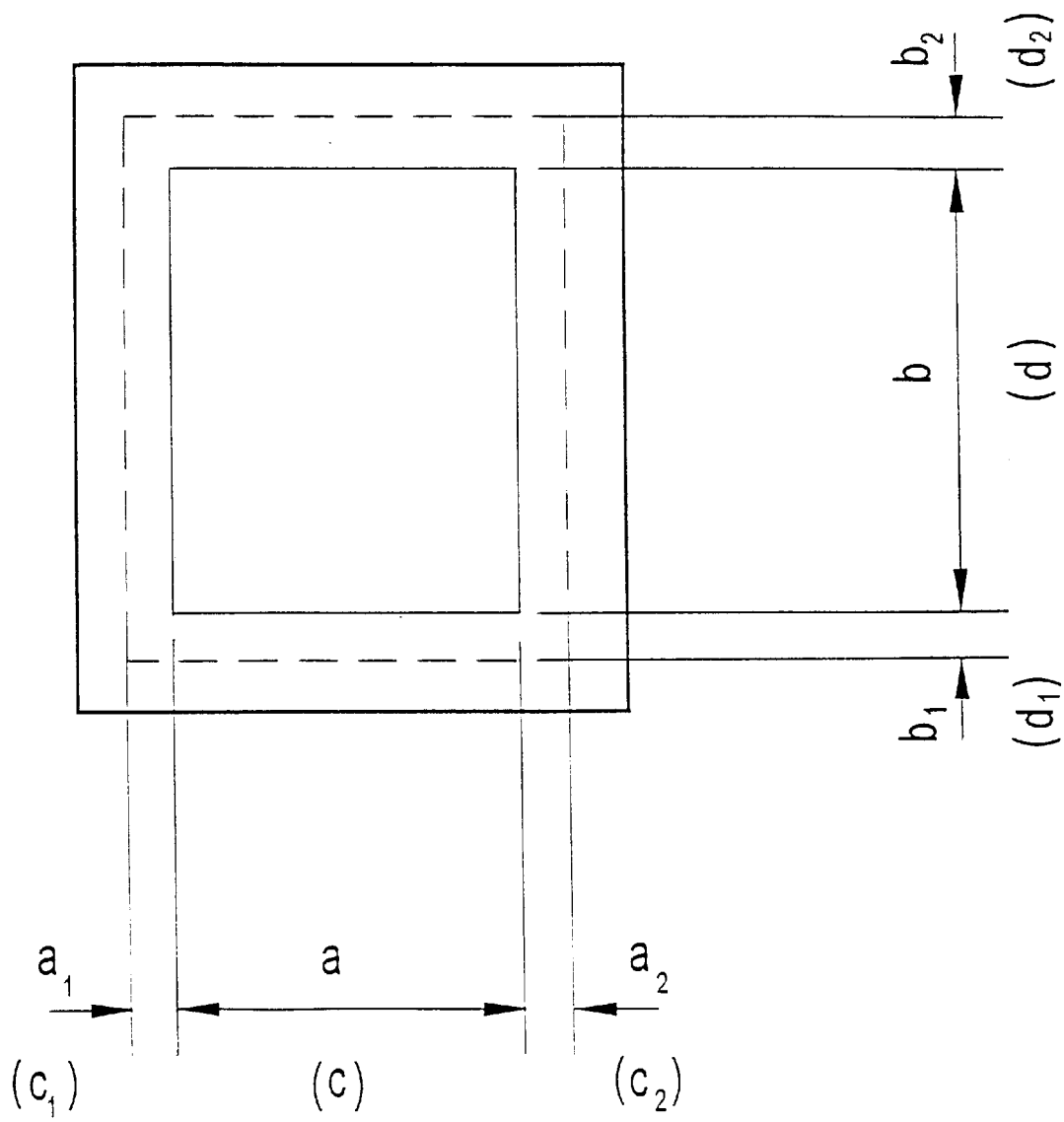
FIG. 3 is a top view showing the division of the image scanning surface.

It can be seen from FIG. 3 which shows a top view of the image scanning surface 1 that the surface portion determined by a and b is provided for recording fingerprint or palm print images, while edge areas $a_1$, $a_2$, $b_1$ and $b_2$ are reserved for the arrangement of reference structures. Just as the edge areas $a_1$ and $a_2$ of the image scanning surface 1 correspond to the edge areas $c_1$ and $c_2$ of the reception surface 11, edge areas are also allocated to the edge areas $b_1$ and $b_2$ of the image scanning surface 1 on the reception surface 11; however, these edge areas are only shown in their lateral projection in FIG. 2 because they lie outside of the drawing plane and extend parallel to the latter.

Figure 5:
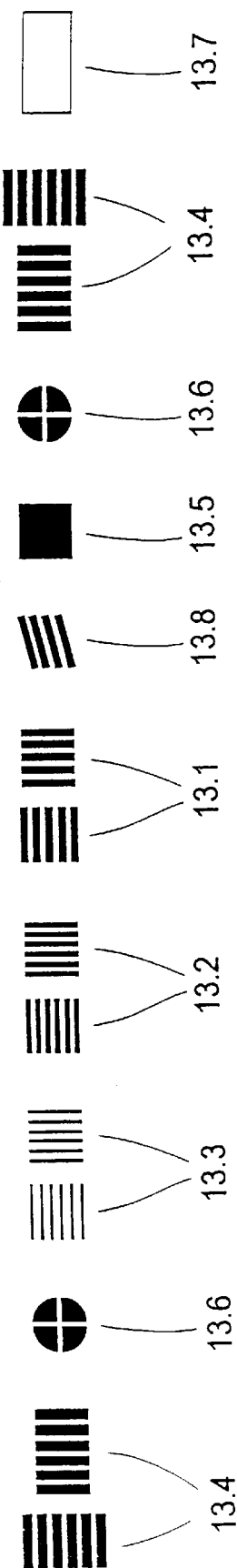
FIG. 5 shows examples for reference structures.

FIG. 5 shows how the reference structures 13 can be formed. Structures 13. 1, 13.2 and 13.3 which are formed of a plurality of lines extending parallel to one another and arranged in groups at right angles to one another are used to measure contrast, wherein the measurement results are compared horizontally and vertically with the stored requirements for the MTF, e.g., at 10, 8 and 6 LP/mm. In addition, the images obtained from structures 13.4 serve as a basis for the comparison with the MTF requirements for 1 LP/mm. The determined contrast values are a measurement for the MTF which can be achieved with the arrangement.

With reference to structures 13.4, it is also possible to check the image scale at close range by measuring the center distance of the lines, wherein, for example, the spatial frequency of 1 LP/mm is used as a basis.

Referring to structure 13.5, the MTF can be determined by means of Fourier analysis of the light-dark and dark-light transitions in horizontal and vertical direction and can be compared with the stored reference values for these transitions.

The center distance of the structures 13.6 is known very exactly. By counting the image points between the centers of these structures 13.6 and forming the ratio to the center distance, the image scale and the geometric distortion are determined.

A linearity check can be based on an empty field 13.7 insofar as the shutter of the detection device is adjusted in defined steps during constant illumination and the respective available output signal is compared with stored presets.

Finally, the presence of all gray steps is possible with a structure 13.8. The inclination of the lines relative to the lines of the rest of the structures is selected in such a way that all gray steps occur and it is therefore ensured that they will be checked.

It is possible to check the signal-to-noise ratio using structure 13.7 in that the spatial noise is determined in a sufficiently large surface portion and the temporal noise is determined at selected individual sensors of the reception surface 11 and the values obtained in this way are checked as to whether or not they adhere to permissible deviations compared with the stored presets.

An output signal which depends on the adherence to or deviation from the predetermined parameters and which is available at the evaluating circuit can be utilized for initiating an acoustic, optic or other indication perceptible to the operator.

Figure 4:
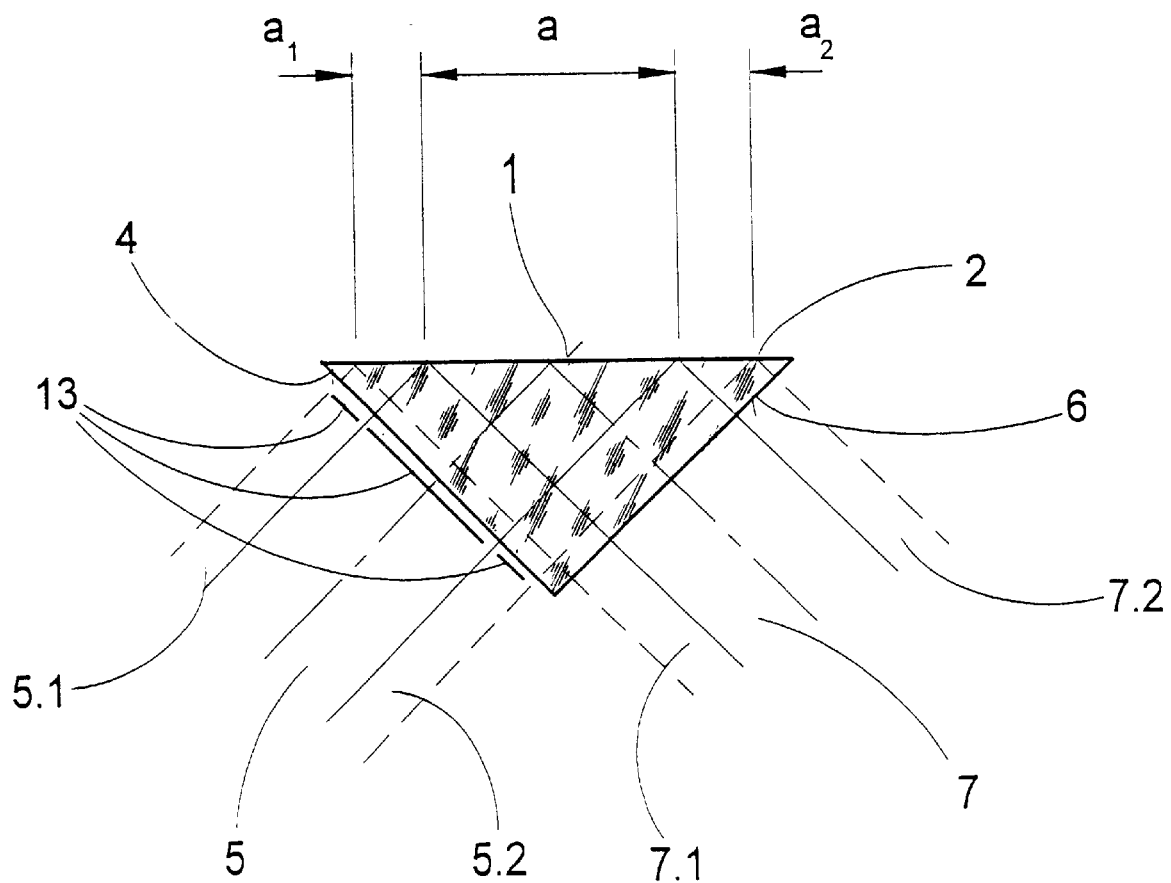
FIG. 4 shows the positioning of reference structures in a first variant.

In constructions of the invention according to FIG. 4, the reference structures 13 are not arranged on the image scanning surface 1, or only in part; instead, they are arranged on the entrance face 4. In so doing, the reference structures 13 are positioned in portions of the entrance face 4 which lie outside of the area by which the light required for recording the fingerprints and palm prints enters the scanning prism 2.

Alternatively, reference structures 13 can also be arranged on the exit face 6 of the scanning prism 2. The advantage in positioning on the entrance face 4 and exit face 6 consists in that the reference structures 13 are protected against contact with the fingers or hands to be placed on the image scanning surface 1 and accordingly from contamination and falsification of the reference signal. As an alternative to the latter construction, protective coverings 14 can be provided over the reference structures arranged on the image scanning surface 1, as is shown schematically in FIG. 2.

What is claimed is:

1. An arrangement for detecting the surface structures of fingers, palms or other parts of the skin placed on an image scanning surface comprising:

said image scanning surface being formed at a scanning prism;

an illumination beam path being directed to the image scanning surface in the interior of the scanning prism, and the beam reflected from the latter impinging on the reception surface of an optoelectronic detection device;

a part of the illumination beam path or a separate illumination beam path being directed to reference structures and, from the latter, to the reception surface;

separate partial areas of the reception surface being reserved for the detection of the surface structures and for the detection of reference structures.

2. The arrangement according to claim 1, wherein the reference structures are arranged so as to be fixed in place on the scanning prism, wherein separate partial areas which do not intersect are reserved for the reference structures and for the surface structures to be detected, and a common illumination beam path is provided for these partial areas.

3. The arrangement according to claim 1, wherein the reference structures are arranged so as to be fixed in place on the entrance face of the scanning prism, wherein separate partial areas which do not intersect are reserved for the reference structures and for the surface structures to be detected, and a common illumination beam path is provided for these partial areas.

4. The arrangement according to claim 1, wherein the reference structures are arranged so as to be fixed in place on the exit face of the scanning prism, wherein separate partial areas which do not intersect are reserved for the reference structures and for the surface structures to be detected, and a common illumination beam path is provided for these partial areas.

5. The arrangement according to claim 1, wherein the reference structures are arranged so as to be fixed in place on the image scanning surface of the scanning prism, wherein separate partial areas which do not intersect are reserved for the reference structures and for the surface structures to be detected, and a common illumination beam path is provided for these partial areas.

6. The arrangement according to claim 1, wherein semi-transparent reference structures are introduced in the illumination beam path and/or in the beam reflected by the image scanning surface.

7. The arrangement according to claim 6, wherein the semi-transparent reference structures are arranged on the scanning prism so as to be fixed in place or are reflected into the beam path, wherein the cross-sectional areas of the beam path provided for the detection of the surface structures and the cross-sectional areas of the beam path provided for the detection of the references structures and the surface portions of the reception surface provided for the detection of the surface structures and the surface portions of the reception surface provided for the detection of the reference structures intersect.

8. The arrangement according to claim 1, wherein the optoelectronic detection device is combined with an evaluating circuit in which the images which are obtained from the reference structures are subjected to a comparison with stored data, and conclusions concerning whether or not the predetermined device parameters are adhered to can be drawn from the comparison.

9. The arrangement according to claim 6, wherein a first computing function for determining a correction factor $i_{ij}$ for every image element ij is provided in the evaluating circuit, where $k_{ij}$=reference gray value/actual gray value, wherein every image element ij corresponds to an individual sensor of the reception surface, the reference gray values are determined for every individual sensor with a uniformly bright image without structures and, further, a second computing function is provided by which the determined actual gray value of every image element ij is multiplied by the associated correction factor $k_{ij}$, resulting in an image of the surface structure which is free from reference structures.

10. The arrangement according to claim 6, wherein a control circuit is provided, by which the reference structures are recorded and the recorded images are compared with the stored data whenever the apparatus is put into operation and/or after expiration of a predetermined operating period.

11. The arrangement according to 6, claims wherein a control circuit is provided by which the detection of the reference structures is initiated manually and comparison with the stored data can therefore be carried out at optional times.

12. The arrangement according to claim 2, wherein covers are provided for the reference structures arranged on the image scanning surface.

13. The arrangement according to claim 1, wherein the reference structures arranged on the scanning prism are printed, scratched in, etched, glued on in the form of a film or arranged in some other optically active way.

14. The arrangement according to claim 1, wherein an optical device is provided for reflecting and/or mixing reference structures into the illumination beam path or in the beam path reflected by the image scanning surface.

15. The arrangement according to claim 1, wherein grooves with different widths and different spacing and orientation are provided as reference marks and are configured for monitoring the image transfer, the MTF, the image scale, geometric distortion, gray step linearity, gray value number and/or signal-to-noise ration.

* * * * *